Aug. 24, 1948.   R. H. ELLIS ET AL   2,447,937
METHOD OF LAYING SUBMERGED PIPES
Filed Feb. 28, 1947   2 Sheets-Sheet 1
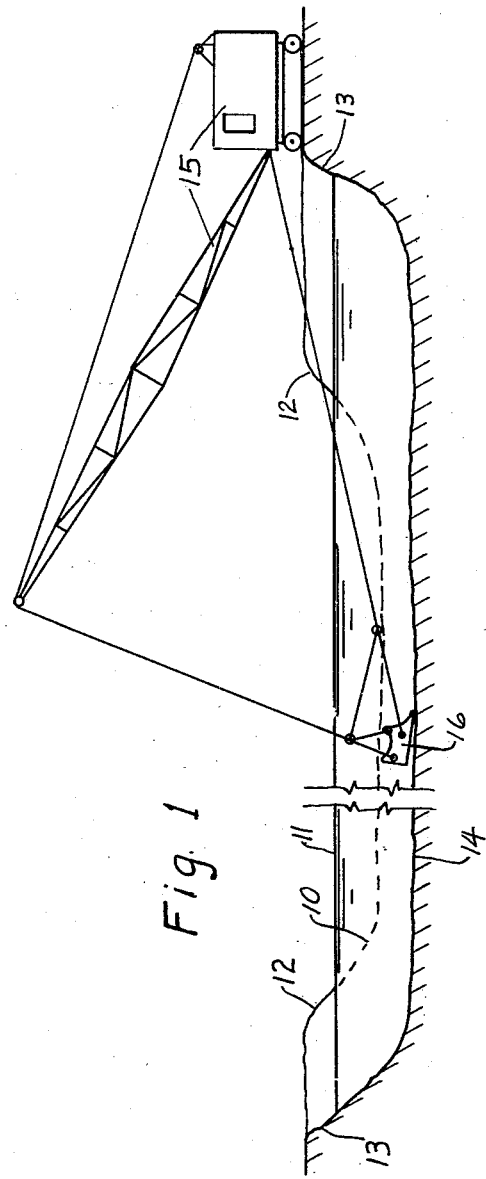
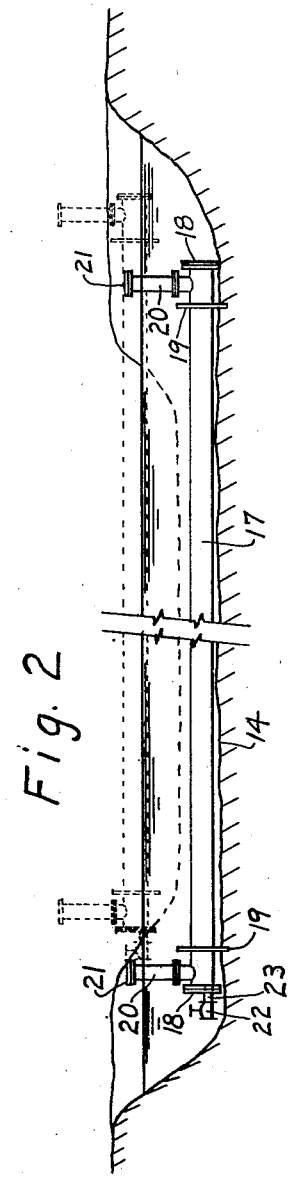
INVENTORS
REUBEN H. ELLIS
BY MARTIN A. MILLING
Lockwood Goldsmith Galt
ATTORNEYS.

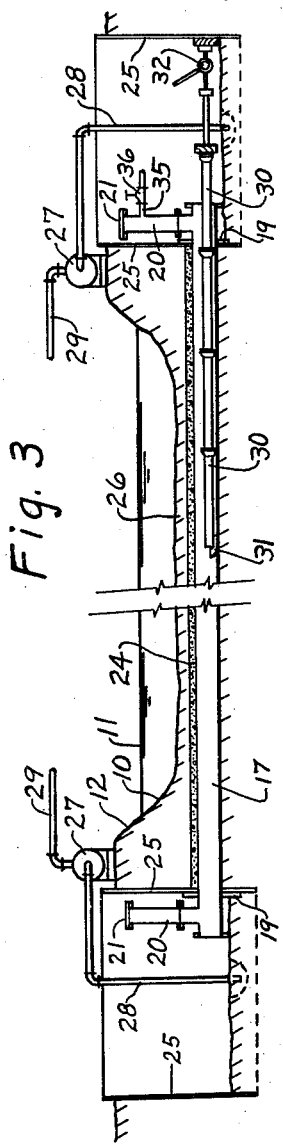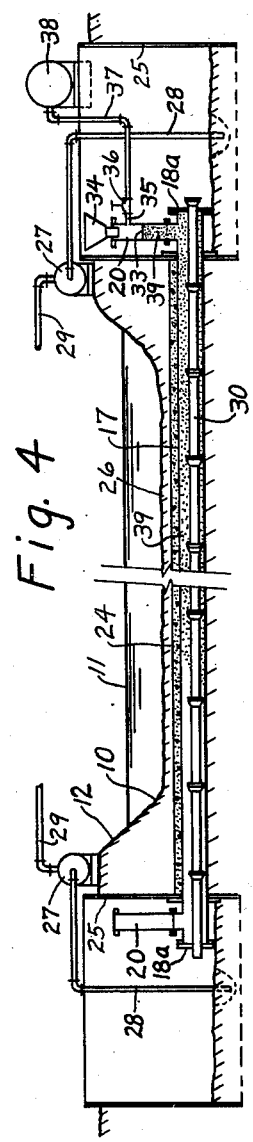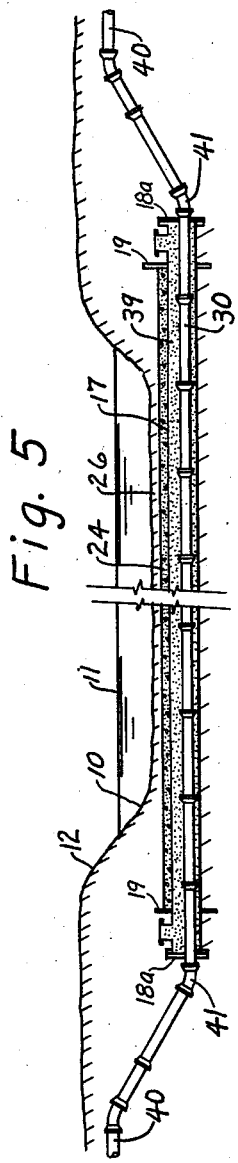

Patented Aug. 24, 1948

2,447,937

UNITED STATES PATENT OFFICE 2,447,937

METHOD OF LAYING SUBMERGED PIPE

Reuben H. Ellis, Alexandria, and Martin A. Milling, Anderson, Ind.

Application February 28, 1947, Serial No. 731,593

7 Claims. (Cl. 61—72)

This invention relates to a method of traversing waterways with lines for utility services such as sewer, water, gas, oil and the like.

The present invention is directed to production of such a line as an inverted syphon by floatation and submergence of a conduit and the formation therein of the pipe for such utility service.

The chief feature of the present invention resides in the excavation of a channel or trench across the waterway and in the bed and adjacent banks thereof, floating to that channel a protector conduit, submerging same in said channel, ballasting and back filling the conduit and channel respectively, coffer damming the opposite ends of the conduit, and then removing the water from the coffer-pits and conduit.

A second feature of the invention resides in laying within the conduit of a sectionalized pipe, and then filling the space between the conduit and pipe.

The pipe may be supplied to the conduit prior to floatation, etc., or subsequent to submergence and ballasting. Herein the latter species is disclosed by way of example only.

Other objects and features of the invention will be set forth more fully hereinafter.

The full nature of the invention will be understood from the accompanying drawings and the following description and claims.

In the drawings:

Fig. 1 is a longitudinal central sectional view through a stream bed and banks with an excavator in side elevation showing preliminary bed treatment.

Fig. 2 is a similar view of the bed, the excavator being removed, the conduit being shown by full lines in the trench formed in the bed and submerged, dotted lines showing the conduit in the floated position immediately prior to sinking same into the trench.

Fig. 3 is a similar view showing the coffer dams at each end of the conduit structure, the ballast for retaining the conduit in the trench, the trench being back filled, and several pipe sections in the conduit.

Fig. 4 is a similar view showing the pipe sections extending completely through the conduit or casing and the latter partially filled to hold the pipe sections in position within the casing and to further reenforce the casing and ballast the same.

Fig. 5 is a similar view with the coffer dams removed and the coffer pits backfilled and the ends of the sectionalized pipe, exposed by the conduit, being connected to a supply and outlet on opposite banks of the stream to complete the supply line.

In Fig. 1 of the drawings 10 indicates a waterway to be crossed, the stream level being indicated at 11. From one or both banks, in the latter case successively or simultaneously, the banks 12 are cut down as at 13 and a channel or trench 14 is formed across the stream bed. A crane 15 with drag line bucket 16 may be employed for such purpose.

A conduit 17 of the requisite length to cross the waterway, see Fig. 2, has opposite ends sealed by plates 18. Connected to the conduit near each end are anchor flanges 19 and risers 20. The upper ends of risers 20 are closed with removable plates 21.

At least one end includes control valve 22 and extension 23, although both ends may be valve controlled if desired. Whenever desired or required intermediate risers may be employed. The dotted lines in Fig. 2 illustrate the sealed end conduit floating above the trench. It may be guided and restrained in any suitable manner.

When so positioned valve 22 is opened and the water flows into and fills the conduit displacing the air therein, the latter escaping by way of the riser or risers. The trench seated conduit 17 is then ballasted by applying by suitable means such as a funnel a sufficient amount of concrete 24, see Fig. 3, to the trench and over the conduit.

This rigidly holds the conduit in place. The ends of the conduit are then coffer dammed as shown at 25, see Fig. 3, and the spoil removed from within same may be used for backfilling 26 above the ballast. Pumps 27 with suction lines 28 and discharges 29 then empty the coffer pits and the conduit of water and the pumps hold same empty even if some leakage occurs. When thus emptied the conduit is held to the trench by its weight, the ballast and the backfilling.

If the delayed laying species be employed, sections of pipe 30 are successively applied to the now-open end of conduit 17, see right hand portion of Fig. 3.

The initial section entering end may be shod as at 31 in any desired manner. Additional sections are aligned and forced into the conduit by suitable means such as indicated at 32. The pipe sections may have any suitable type of interconnection.

When the entering end of the pipe appears at and projects from the opposite end of the conduit 17, both ends of conduit are closed by plates 18a, see Fig. 4.

To the upper end of riser 20, see right hand portion of Fig. 4, is applied hopper 34 and to the side is connected nipple 35 controlled by valve 36 in turn connected to pressure line 37 which is connected to a source of air pressure 38. Cement mortar or concrete 39 of semi-fluid consistency is then supplied to riser 20 through hopper 34 until resistance to the flow of mortar or concrete in conduit 17 is sufficient to cause this material to rise in the riser as at 33. Air pressure is then applied to the filling material after hopper 34 is removed and the upper end of riser 20 made airtight by replacing plate 21. The mortar or concrete being sufficiently fluid is forced downwardly in the riser and outwardly into the space between the conduit 17 and pipe 30.

When sufficient mortar or concrete has been thus intermittently supplied and pressure applied to completely fill the conduit, the air therein escaping from the riser 20 at the opposite end, both risers are detached and removed together with all associated connections and devices. The land ends 40 of the utility line are connected as at 41 to the conduit exposed ends of the piping 30, or same, for sewer purposes, may all be connected to manholes, not shown.

The coffer dams may be removed at any time deemed expedient or desirable and the coffer pits back-filled. The completed submerged syphon is illustrated in Fig. 5.

By way of example only, a 120 ft. length of conduit, 31 inches in diameter, was supplied with an 18 in. diameter pipe and the space therebetween filled with concrete in about two hours, which is well within the initial setting time of certain concrete mixtures.

When the amount to be supplied prevents actual supply within such limit of time, either by reason of the length of the conduit or amount of space to be filled or for any other reason, the conduit may include a central riser that terminates above water level 11 and concrete may be simultaneously applied from opposite ends of the conduit, the air venting at that central riser.

The rates of supply being substantially equal, inspection need be exercised at the central riser only near the initial completion period. When the concrete appears in that riser the supply thereof is discontinued from the end that is filled and the supply continued from the other end until concrete therefrom also appears at the central riser.

Then both supplies are operated to completely fill the midportion of the conduit. The central riser may then be detached and removed.

This riser is removed so it will not constitute either a navigation hazard, or an abutment for a tree, etc., to lodge against during freshets, thereby eliminating the hazard of displacing or upturning of the conduit and pipe.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A method of forming a submerged siphon and like structure comprising excavating a trench across a river bed, sinking a floatable conduit in the trench, and of a length sufficient to at least terminate at the river banks, permanently weighting the sunken conduit by application of concrete and the like thereover, coffer damming the ends of the conduit, removing the water therefrom and in the coffer dams, inserting pipe into at least one end of the conduit until the pipe is co-extensive with the conduit and projects beyond the same at both ends thereof, and finally filling the space between the pipe and conduit with suitable material such as concrete for further ballasting, reenforcement and the like.

2. A method as in claim 1, the steps of providing the conduit with elongated lateral vents and closable ends and sinking the conduit by opening the vents, the vents being of a length greater than the trench depth, the sinking being accompanied by the opening of at least one closed end of the conduit when the latter is registered above the trench and the opening of at least one vent on the conduit above the river level.

3. A method as defined by claim 2 wherein the filling of the conduit between the pipe and same is effected through a conduit vent, and then removing the vent upon completion of the conduit filling.

4. A method as defined by claim 1 wherein the pipe insertion to the conduit is effected following submergence and ballasting of the latter.

5. A method as defined by claim 1 wherein the pipe insertion to the conduit is effected following submergence and ballasting of the latter, the pipe being sectional in character and the section lengths being effectively less than the coffer dam dimension aligned with the conduit, the pipe insertion being of repetitious section connection and advance until the sectionalized connected pipe projects from the conduit at the end thereof opposite section insertion end.

6. A method as defined by claim 1 wherein the conduit filling is accomplished by successive applications of filling material and application of pressure thereto to effect successive advance of the material in the conduit.

7. A method as defined by claim 1 wherein the conduit filling is accomplished by successive applications of filling material and application of pressure thereto to effect successive advance of the material in the conduit, the conduit being vented to facilitate filling material advance, removing the material and pressure supply and vent means, and connecting the syphon to the adjacent ends of the supply line.

REUBEN H. ELLIS.
MARTIN A. MILLING.

REFERENCES CITED

The following references are of record in the file of this patent:

FOREIGN PATENTS

| Number | Country | Date |
|---|---|---|
| 543,871 | Germany | 1932 |